Figure 1:
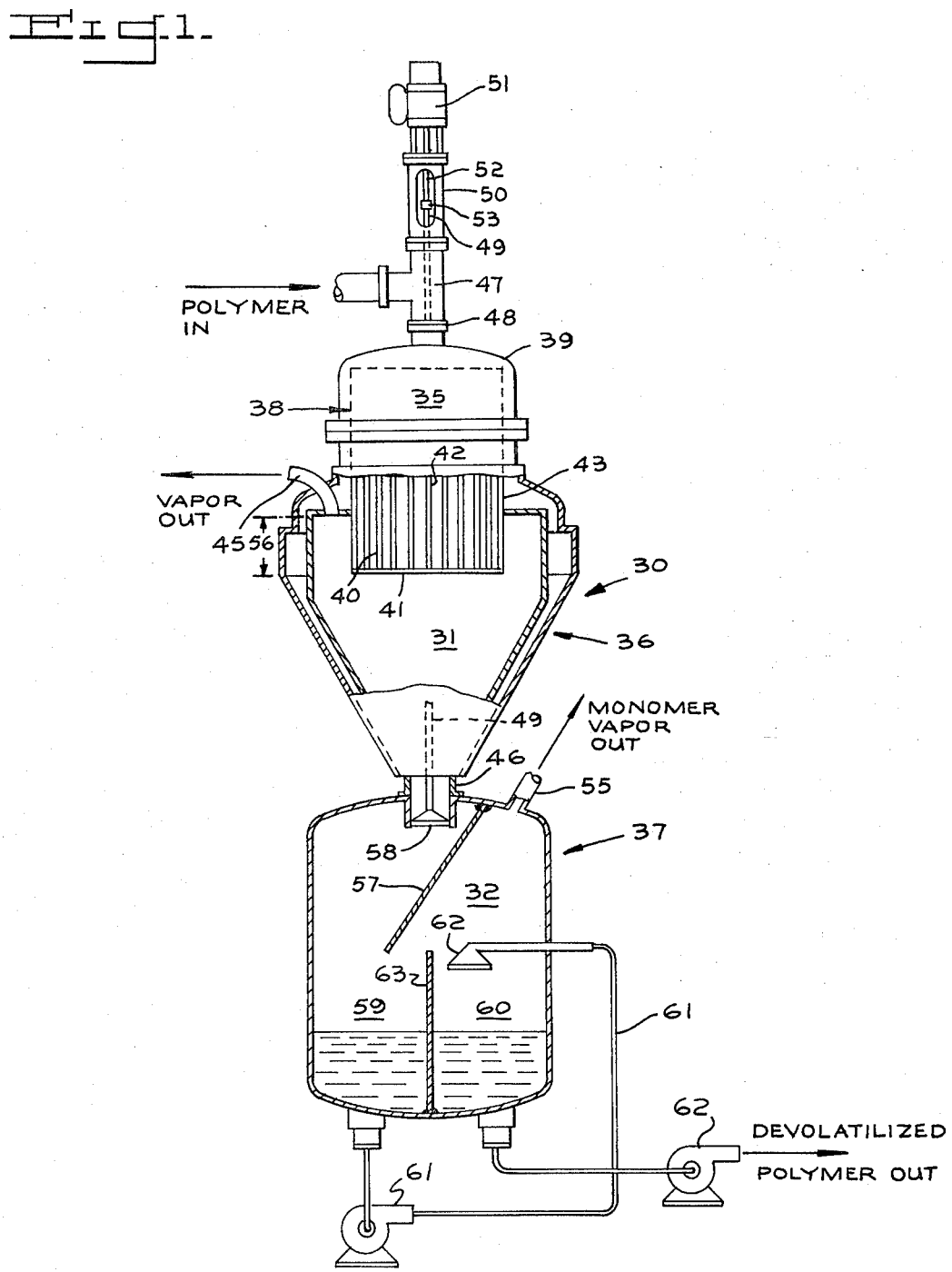

United States Patent [19]

Newman

[11] 4,294,652

[45] Oct. 13, 1981

[54] FALLING STRAND DEVOLATILIZER

[75] Inventor: Randolph E. Newman, Belchertown, Mass.

[73] Assignee: Monsanto Company, St. Louis, Mo.

[21] Appl. No.: 164,414

[22] Filed: Jun. 30, 1980

[51] Int. Cl.³ .............................................. B01D 1/00
[52] U.S. Cl. .................................. 159/2 R; 159/1 C; 159/DIG. 10; 159/DIG. 16; 528/501
[58] Field of Search ................. 159/1 C, 22, DIG. 16, 159/2 R, DIG. 10; 528/501, 502

[56] References Cited

U.S. PATENT DOCUMENTS 2,893,926  7/1959  Worthen et al. ........... 159/DIG. 16
3,853,672 12/1974  Gordon et al. ............ 159/DIG. 10
3,928,300 12/1975  Hagberg .................... 159/DIG. 10
3,995,001 11/1976  Vroomans et al. ................. 528/502

Primary Examiner—Norman Yudkoff
Attorney, Agent, or Firm—Joseph S. Nelson; William J. Farrington; Edward P. Grattan

[57] ABSTRACT

The present invention relates to an improved falling strand devolatilizer apparatus having a plurality of stages for devolatilization providing polymers with lower residual monomer and/or volatile contents. The novel apparatus utilizes a final flash tank having two flash compartments that share a common heating and vacuum system wherein a recycle line transfers polymer melt from the first compartment to the second compartment for additional devolatilization.

5 Claims, 1 Drawing Figure

FALLING STRAND DEVOLATILIZER

BACKGROUND OF THE INVENTION

Falling strand devolatilization has been employed for many years to separate a volatile component from a liquid component. Such devolatilization procedure has been especially useful in the manufacture of polymers, such as homopolystyrene where, as in a continuous mass polymerization process, a fluid mixture of homopolystyrene with styrene monomer results, which mixture must be subjected to a post polymerization treatment to remove the unreacted styrene monomre therefrom. For such a removal, a falling strand devolatilizer is a convenient piece of apparatus.

A falling strand devolatilizer as known to the prior art comprises as a preheater a shell and tube heat exchanger adapted to feed heated fluid material from the tubes thereof into a flash tank. An upper portion of a flash tank bears an outlet port which is typically interconnected with a source of vacuum. A fluid mixture being devolatilized is first subjected to a preheating step in the shell and tube heat exchanger after which the so heated mixture is subjected to a flashing step in which the so heated mixture is discharged into the flash tank wherein the conditions of pressure and temperature are so regulated that volatiles (e.g. especially monomer) are above their boiling point while the desired component (e.g. homopolystyrene) is maintained below its boiling or decomposition point. Vaporization of volatiles is prompted by continuously exhausting vapor of volatiles through the vacuum outlet port of the flash tank. Commonly as in the falling strand devolatilization of a polymer such as homopolytyrene admixed with styrene monomer, it is preferred to subject the polymer/monomer mixture to two successive stages of falling strand devolatilization, the conditions of temperature and pressure employed in the second stage being somewhat more rigorous than those used in the first stage. For each such stage of devolatilization, it has heretofore been thought necessary to employ a heat exchanger assembly preceding each of the two flash tanks.

It has been disclosed in U.S. Pat. No. 3,853,672 that in two stage falling strand devolatilization, the presence of a second preheater can be completely avoided between the first and second flash vaporization tanks. This discovery makes it possible to eliminate a costly sub-assembly heretofore thought necessary in two successive stages of falling strand devolatilization. In addition, this discovery permits the pressure to be varied in the first chamber without affecting the pressure or the resulting residual monomer in the second chamber. Regulation of this first chamber pressure can be used to control the residence time through the preheater, and the stripping effect of high boiling materials and the properties associated with the time/temperature history. Furthermore the elimination of a second heat exchanger can improve the properties of many polymeric materials by minimizing the time/temperature history.

To accomplish the elimination of the second heat exchanger, and, at the same time, maintain during devolatilizer operation an adequate pressure differential between the first flash zone and the second flash zone, it was found necessary to interpose between the first and the second flash vaporization tanks in place of the shell and tube heat exchanger, a variable fluid transfer regulation means such as a valve or a pump which is adapted to maintain a prechosen fluid material level in the bottom of the first flash vaporization tank.

Such a fluid level is used to maintain during apparatus operation a necessary and desirable pressure differential between the first and the second flash vaporization tanks and still permit fluid material to flow from the one into the second flash tank continuously.

SUMMARY

The present invention relates to an improved staged falling strand devolatilizing apparatus for a polymer-monomer melt, comprising a heating means for said melt mounted integrally above first and second flash vaporization tanks positioned respectively in contiguous descending vertical relationship and communicating with one another, means for producing a different vacuum within each of said flash vaporization tanks and means for maintaining an elevated temperature in said tanks.

PREFERRED EMBODIMENTS

FIG. 1 illustrates one embodiment of a falling strand devolatilizer suitable for the practice of the present invention, such devolatilizer being designed in its entirety by the reference numeral 30. Falling strand devolatilizer 30 can be considered to be composed of a shell and tube heat exchanger assembly herein designated by the numeral 35, a first flash tank 36 and a second flash tank 37.

The heat exchanger assembly 35 is comprised of a shell and tube exchanger body section 38 in a bonnet or header section 39. Within the body section 38 are mounted a plurality of spaced, parallel tubes composed of steel or the like. Tubes 40 extend between and are mounted into at their respective opposite end regions a pair of plates 41, as by welding or the like, the plates, as are all other elements in this heat exchanger, being typically composed of steel or the like. Spacing between the plates and rigidity for the entire assembly of plates 41 and tubes 40 is augmented by tie rods 42. Tubes 40 are thus placed in sealing engagement with plates 41. Tubes 40 are circumferentially encased by a shell or wall 43, thereby to provide a generally sealed interior region between tubes 40 and the interior wall of shell 43 for circulation of heat transfer fluid.

The first and second flash tanks 31 and 32 of devolatilizer 30 are of double walled jacketed construction for the purpose of controlling the interior temperature of the tanks during operation of the devolatilizer. A vapor take-off port is provided by the pipe and flange assembly 45 which communicates with the interior space of the tank 31 and a second vapor take-off port is provided in the second flash tank by means of pipe 55. The second flash tank 32 communicates with the first flash tank 31 by means of the interconnecting pipe 46. The shell and tube assembly 35 is mounted atop and protrudes into the flash tank 31. Hot melt to be devolatilized is conveniently input into bonnet 39 via pipe and flange assembly 47 which interconnects with the pipe and flange assembly 48. Pipe and flange assembly 47 interconnects with a melt pump (not shown) which is adapted to input into the heat exchanger assembly 35 an appropriate composition to be devolatized.

In order to control the movement of material from the bottom regions of the flash tank 31 into the second flash tank 32 through the pipe 46, the falling strand devolatilizer has conveniently mounted across and within pipe 46 a plug type valve assembly which is adapted to regulate the rate of degrees of fluid material from the bottom of flash tank 31 into tank 32. Such a valve assembly includes a long-stem 49 which extends upwardly through the flash tank 31 and through an appropriate channel axially located in the heat exchanger assembly 35, axially through the pipe and flange assembly 47 to project into a pedestal 50, there being an appropriate sealing means about the valve stem 49 in the upper region of the pipe and flange assembly 47. An actuator assembly 51 on the top side of pedestal 50 has a shaft 52 which engages the upper end of the stem 49 by means of a collar 53. The actuator 51 is responsive to a level senser assembly (now shown) adapted to measure fluid level in the bottom region of tank 31. A controller assembly (not shown) couples the level senser with the actuator assembly 51 to complete the remove control of a power-actuated valve assembly in the base of the tank 31.

In operation, the heated composition to be devolatitized enters the tank 31 from the bottom of exchanger assembly 35 and the monomer vapor is promptly flashed away from the polymer melt. The vapor is taken off through pipe and flange assembly 45 in the top of tank 31. The annular area 56 defined within vessel 31 by the inner walls thereof and the adjoining wall of heat exchanger assembly 35 acts as a manifold-live device to collect the vapor and direct it out pipe and flange assembly 45. By having the heat exchanger assembly 35 recessed in the upper region of the tank 31, the tendency of polymer to be thrown within the tank 31 radially sidewardly and hence into the mouth of the pipe and flange assembly 45 is avoided. The once-devolatilized material is then permitted to pass from the first flash tank 31 into the second flash tank 32 immediately therebeneath by means of gravity flow. Because the second flash tank 32 is at a lower pressure than the first flash tank, any residual monomer contained in the polymer melt is flashed away in the second stage and withdrawn by means of pipe 55.

For further details on a suitable plug type valve 58 can be found in U.S. Pat. No. 3,795,256 and is hereby incorporated by references.

The baffle 57 can be a flat surface plate of conventional metal construction. FIG. 1 shows the baffle being attached by suitable means such as welding or flange attachments such that the baffle extends downwardly at an angle under the valve area to catch the falling part devolatilized melt from the first tank and move it into the first bottom side compartment 59, as a second devolatilized melt. The melt is then pumped from the first compartment to a second bottom compartment 60 by suitable pump means and a recycle transfer conduit or pipe 61. The pipe is terminated by an orifice means 62 which increases the surface area of the falling melt to insure efficient devolalization as a third devolatilized melt. Said third melt is withdrawn from the second compartment by a suitable pumping means 62 as a devolatilized polymer.

The first and second bottom side compartments are formed by a generally vertical partition 63, dividing said second tank into substantially equal compartments, said partition 63, extending from the bottom of said second tank 37 for a portion of its vertical dimension of said second tank allowing each compartment to operate under a common partial vacuum contained in said second tank.

The polymer melt material introduced into the falling strand devolatilizer of the present invention typically contains from about 60 to 90 weight percent styrene polymer, 10 to 40 weight percent styrene monomer and minor amounts of the aforementioned additives and impurities. It is fed to the preheated at temperatures from about 140° and 240° C. and exits therefrom at a temperature within the range of about 200° to 280° C. The pressure at which the first flash tank 31 is held ranges from about 50 to 200 mms. of HgA., whereas the pressure of the second flash tank 32 typically is held within the range of from about 3 to 20 mms. of HgA. The temperature in both of the devolatilization stages is maintained at between about 200° and 250° C. The amount of vaporized material withdrawn from the first tank is generally approximately 10 times the amount of vaporized material which is obtained from the second devolatilization stage. In all cases, the monomer content of the final polymer product exiting the bottom of the second bottom compartment 60 is less than 0.1 percent, and in most cases is less than about 0.05 to 0.01 percent by weight.

FIG. 1 represents a particular preferred two stage devolatilizer system having two flash tanks with the second flash tank divided into two chambers to provide three stages of devolatilization. Those skilled in the art, based on the present disclosure, then can modify conventional two stage devolatilization system to three stages of devolatilization by the present invention. It is to be understood that the protection to be afforded the present invention is to be limited only by the scope of the claims appended hereto.

What is claimed is:

1. An improved staged falling strand devolatizing apparatus for a polymer-monomer melt, comprising a heating means for said melt mounted integrally above first and second flash vaporization tanks positioned respectively in contiguous descending vertical relationship and communicating with one another, means for producing a different vacuum within each of said flash vaporization tanks and means for maintaining an elevated temperature in said tanks, the improvement comprising: said second tank having a baffle means to pass the falling strand melt to a first bottom side compartment of said second tank, a recycle transfer means for the melt from said first side compartment to a second bottom side compartment in said second tank such that the melt is devolatilized again by the vacuum applied to said second tank and a means to withdraw the melt from said second side compartment, said first and second bottom side compartments are formed by a generally vertical partition dividing said second tank into substantially equal compartments, said partition extending from the bottom of said second tank for a portion of the vertical dimension of said second tank allowing each compartment to operate under a common partial vacuum contained in said second tank.

2. An apparatus of claim 1, wherein said transfer means comprises a pump adapted to withdraw said molten material from said first compartment and pump said material through a transfer line into an upper section of said second side compartment, said transfer line being terminated by an orifice that increases the surface area of said falling material during devolatilization.

3. An apparatus of claim 1, wherein, said baffle means is a flat surface means extending from the top of said second tank downward at an angle such that said surface passes under the total area of a valve means connecting said first and second tanks, said angle being sufficiently close to the verticle cause said falling melt material to contact said surface and flow by gravity into the first side compartment of said vessel.

4. An apparatus of claim 3, wherein, said flat surface means is in a flat sheet of metal.

5. An apparatus of claim 1, wherein, said baffle means is in a generally curved trough passing at an angle under the total area of said valve means, said angle being sufficiently close to the verticle to cause said falling molten materials to contact said trough and flow by gravity into said first side compartment.

* * * * *